United States Patent [19]

Hasegawa et al.

[11] Patent Number: 5,144,117
[45] Date of Patent: Sep. 1, 1992

[54] ILLUMINATION TYPE OPTICAL RECORDED INFORMATION READING DEVICE

[75] Inventors: Kazuo Hasegawa; Hisashi Murata, both of Furukawa; Ikuo Ouchi, Miyagi, all of Japan

[73] Assignee: Alps Electric Co., Ltd., Tokyo, Japan

[21] Appl. No.: 653,191

[22] Filed: Feb. 7, 1991

[30] Foreign Application Priority Data

Feb. 27, 1990 [JP] Japan ................. 2-18308[U]
Apr. 17, 1990 [JP] Japan ................. 2-99373

[51] Int. Cl.⁵ .............. G06K 7/10; H05B 37/02; F21V 5/08; G05F 1/577
[52] U.S. Cl. ................ 235/455; 315/297; 323/269; 362/244; 362/800
[58] Field of Search ............ 323/269, 273, 280; 235/455; 315/297, 307; 362/244, 235, 236, 237, 800

[56] References Cited

U.S. PATENT DOCUMENTS

| | | | |
|---|---|---|---|
| 3,705,316 | 12/1972 | Burrows et al. | 307/311 |
| 3,754,181 | 8/1973 | Kreitz et al. | 323/1 |
| 3,784,844 | 1/1974 | McGrogan | 307/310 |
| 4,528,444 | 7/1985 | Hara et al. | 235/462 |
| 4,814,667 | 3/1989 | Tanaka | 362/800 |
| 4,818,847 | 4/1989 | Hara et al. | 235/455 |
| 4,847,734 | 7/1989 | Katoh et al. | 362/244 |
| 4,941,072 | 7/1990 | Yasumoto et al. | 362/800 |
| 5,025,204 | 6/1991 | Su | 323/273 |
| 5,065,188 | 11/1991 | Kobayashi et al. | 362/800 |

FOREIGN PATENT DOCUMENTS 30064 2/1987 Japan ................. 362/800

*Primary Examiner*—John W. Shepperd
*Attorney, Agent, or Firm*—Guy W. Shoup; B. Noel Kivlin

[57] ABSTRACT

An illumination type optical recorded information reading device including a plurality of light emitting elements, a photo detector for detecting optical indication on a media and converting the detected indication to electrical information, a plurality of driving elements for driving the light emitting elements, a driving current detector for detecting a total value of driving currents flowing through the driving elements, and a controller for comparing the total value with a reference value and generating a control signal to the driving elements so as to make a difference between the total value and the reference value constant. Further, a distribution of an illuminance of the light to be applied to the media is set in such a manner that the illuminance at positions spaced away from a central portion of a maximum detectable range of the photo detector is higher than that at the central portion, and that the illuminance at opposite end portions of the maximum detectable range is lower than that at the positions spaced away from the central portion.

5 Claims, 10 Drawing Sheets

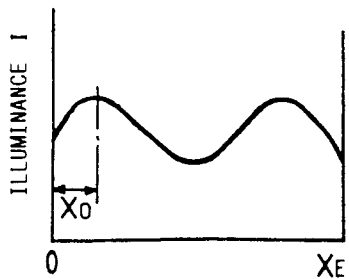
FIG. 3(a)
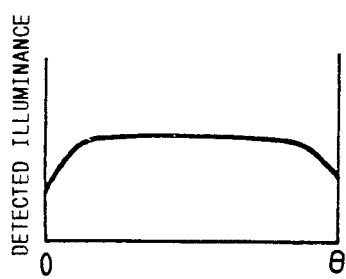
FIG. 3(b)
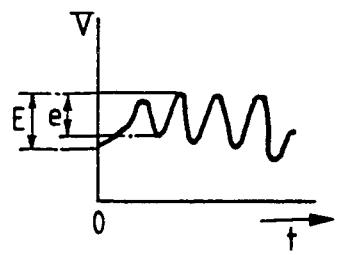
FIG. 3(c)
FIG. 4
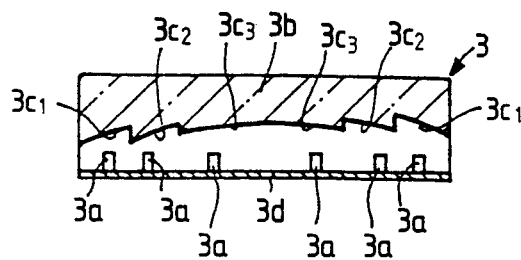
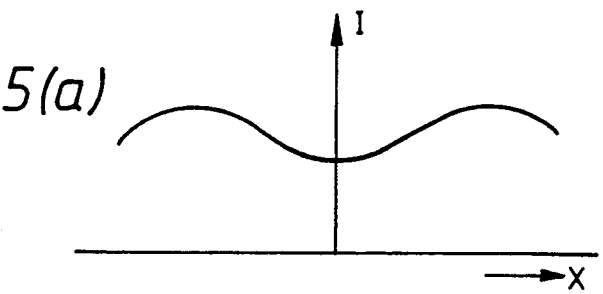
FIG. 5(a)
FIG. 5(b)

ILLUMINATION TYPE OPTICAL RECORDED INFORMATION READING DEVICE

BACKGROUND OF THE INVENTION

The present invention relates to an illumination type optical recorded information reading device having an illuminating means such as a light emitting element for illuminating a media on which optical information such as a bar code is recorded and having a photo detecting element for reading the optical information and converting the same into electrical information. More particularly, it relates to such an illumination type optical recorded information reading device improved in illumination characteristic and reading accuracy.

Conventionally known is an optical information reading device having a line sensor for reading a bar code recorded on a media such as a label, a binary coder for binary-coding an output from the line sensor, and a decoder for decoding a binary-coded output from the binary coder, thereby decoding the bar code. The optical information reading device is provided with a light source such as an LED array for illuminating a region of the bar code on the bar code media. A reflected light from the bar code media is received by the line sensor to read the bar code.

FIG. 15 shows an example of a light source driving circuit employed in the conventional optical information reading device. As shown in FIG. 15, the optical information reading device includes a plurality of LEDs (light emitting diodes) 1 to 10 and a plurality of resistors 11 to 15. The LEDs 1 and 2 and the resistor 11 are connected in series; the LEDs 3 and 4 and the resistor 12 are connected in series; the LEDs 5 and 6 and the resistor 13 are connected in series; the LEDs 7 and 8 and the resistor 14 are connected in series; and the LEDs 9 and 10 and the resistor 15 are connected in series. Each series circuit consisting of the two LEDs and the one resistor is supplied with a DC supply voltage $V_{cc}$ from a single common power supply. With this construction, currents flow through the LEDs 1 to 10, and light is emitted from the LEDs 1 to 10.

All the LEDs 1 to 10 have the same characteristic, and all the resistors 11 to 15 have the same resistance. The resistors 11 to 15 serve to limit the amperage of the currents flowing through the LEDs 1 to 10, and the LEDs 1 to 10 are driven to emit the light having an intensity corresponding to the amperage of the currents flowing therethrough.

The LEDs 1 to 10 constitute a light source for illumination in the optical information reading device, and they are so arranged as to uniformly illuminate a region of the bar code on the bar code media.

The optical information reading device further includes a photo detecting means for detecting a reflected light from the region of the bar code on the bar code media. The photo detecting means is constructed of a line sensor having a plurality of photo detecting elements arranged in rows and a reduction optical system such as a lens for condensing the reflected light from the media. The optical information recorded on the media is converted into electrical information by the photo detecting elements, and the electrical information is sequentially input to a binary coder, in which a waveform of the electrical signal is shaped to be processed for a subsequent operation in a computer.

Such a prior art optical reading device will be described with reference to FIGS. 17 and 18A to 18D.

FIG. 17 schematically shows the arrangement of an optical system in the optical reading device, and FIGS. 18A to 18D show an operation of the optical reading device shown in FIG. 17.

Referring to FIG. 17, a light source 21 constructed of a plurality of LEDs as the light emitting elements arranged in rows emits light as shown by five parallel arrows to illuminate a media 22 in a predetermined range where optical information is indicated by bars and spaces. A reflected light scattered from the surface of the media 22 is transmitted through a lens 25 as the reduction optical system to reach a line sensor 23.

In the case that an illuminance of the light emitted from the light source 21 is uniform in a detectable range of the media 22 by the line sensor 23, and that a reflectance on the surface of the media 22 is constant, a distribution of an illuminance of the light detected by the line sensor 23 is shown in FIG. 18B, wherein a reflected light quantity from the media 22 is gradually reduced from a central portion of a detected range of the line sensor 23 to opposite ends thereof. To make the reflected light quantity uniform over the entire detected range of the line sensor 23, an illuminance distribution in the detectable range on the media 22 is modified as shown in FIG. 18A, wherein the illuminance in the detectable range is gradually increased from the central portion of the detectable range to the opposite ends thereof. Such a modification of the illuminance distribution can be realized by changing a pitch of arrangement of the LEDs or changing an amperage of the currents flowing through the LEDs as described in Japanese Patent Publication No. 62-17270, for example. Accordingly, the reflected light quantity from the media 22 to be detected by the line sensor 23 in the detected range can be made uniform as shown in FIG. 18C, provided that the reflectance on the surface of the media 22 is constant.

In the case that the bar code is present in the detectable range on the media 22, when a boundary between a non-indicated region where the bar code is not indicated and an indicated region where the bar code is indicated is detected by the line sensor 23, an output signal having a large amplitude is generated from the line sensor 23 as shown by "E" in FIG. 18D. Subsequently when the bar code is continuously detected by the line sensor 23, an output signal having a repeated amplitude as shown by "e" in FIG. 18D is generated from the line sensor 23 in correspondence with the bars and the spaces of the bar code. Such an analog waveform signal is supplied through a waveform shaping circuit to a computer in which the signal is processed.

An example of the above-mentioned illumination type optical recorded information reading device is disclosed in U.S. Pat. No. 4,528,444.

In the optical information reading device for reading the bar code, a dry cell is used as the power supply for the purpose of improvement in transportability and easiness of handling. However, an output voltage of the dry cell changes with a service duration and a peripheral environment. FIG. 16 shows a test result of an aged deterioration of the output voltage of the dry cell. The test was carried out under the condition where a discharge load current was set to 150 mA, and the operation of discharging for 5 seconds and stopping the discharging for 60 seconds was repeated at an environmental temperature of 25° C. In FIG. 16, a curve (a) represents a terminal (output) voltage of the dry cell just before the discharging, and a curve (b) represents a terminal voltage of the dry cell just after the discharging.

It is apparent from FIG. 16 that the output voltage of the dry cell is lowered as the service duration proceeds, and that the output voltage on the curve (a) is lowered to lie on the curve (b) after the discharging for 5 seconds, and it is restored to lie on the curve (a) after the stopping of the discharging for 60 seconds. A fluctuation of the output voltage due to the discharging is about 0.1 V even at the beginning of the service duration of the dry cell (i.e., the service duration=0), and the fluctuation increases to about 0.3 V after the service duration of 17 hours near a service life of the dry cell. Further, such a fluctuation occurs in a single dry cell, and if a plurality of dry cells are connected in series for service, the fluctuation is further increased in correspondence with the number of the dry cells.

In the light source driving circuit shown in FIG. 15, when the supply voltage $V_{cc}$ is generated from a dry cell, the amperage of the currents flowing through the LEDs 1 to 10 is changed because the supply voltage $V_{cc}$ from the dry cell changes for the above reason, and the resistance of the resistors 11 to 15 is constant. As a result, a light emission quantity from the LEDs 1 to 10 is changed. Further, even when the output voltage (supply voltage $V_{cc}$) of the dry cell is low, the light source driving circuit can be operated by reducing the resistance of the resistors 11 to 15. However, such a reduction in the resistance of the resistors 11 to 15 causes an increase in a rate of fluctuation in the amperage of the currents flowing through the LEDs 1 to 10 with respect to the fluctuation in the output voltage of the dry cell.

This phenomenon will now be explained in the series circuit of the resistor 11 and the LEDs 1 and 2 by way of example. Letting R denote the resistance of the resistor 11, $V_F$ denote a voltage between an anode and a cathode of each of the LEDs 1 and 2, and I denote an amperage of the current flowing through the LEDs 1 and 2, the amperage I is given as follows:

$$I = (V_{cc} - 2V_F)/R \tag{1}$$

where the voltage $V_F$ is set to 1.7 V, and the amperage I is set to 20 mA. When the supply voltage $V_{cc}$ is 12 V, the resistance R is obtained from the equation (1) as follows:

$$R = (12 - 1.7 \times 2)/(20 \times 10^{-3}) = 430\Omega \tag{2}$$

when the resistance R of the resistor 11 is set to 430Ω, and the supply voltage $V_{cc}$ changes from 12 V by 10% (i.e., 10.8 to 13.2 V), the amperage I changes in the range of 17.21 to 22.79 mA. That is, the amperage I changes by ±14%.

In contrast, when the supply voltage $V_{cc}$ is 5 V, and the amperage I is set to 20 mA, the resistance R becomes 8Ω in the same manner as the above. In this case, when the supply voltage $V_{cc}$ changes from 5 V by 10% (i.e., 4.5 to 5.5 V), the amperage I changes in the range of 13.75 to 26.25 mA. That is, the amperage I changes by ±31.25%. Thus, the rate of the fluctuation in the amperage is larger when the supply voltage is low than when it is high.

As mentioned above, when the supply voltage $V_{cc}$ is fluctuated, the amperage of the currents flowing through the LEDs 1 to 10 to result in a fluctuation in light emission quantity from the LEDs 1 to 10. Furthermore, when the resistance of the resistors 11 to 15 is set to a small value, the rate of the fluctuation in light emission quantity from the LEDs 1 to 10 with respect to the fluctuation in supply voltage is large.

Such a fluctuation in light emission quantity from the LEDs 1 to 10 causes a fluctuation in reflected light quantity from the bar code media to the line sensor, which in turn causes a fluctuation in amplitude of the output signal from the line sensor. As a result, there is a possibility that the output signal from the line sensor is not properly binary-coded in the binary coder circuit, thus causing a decoding error of the bar code.

The above problem is considered to be solved by obtaining the supply voltage $V_{cc}$ from a voltage regulator circuit. However, the voltage $V_F$ between the anode and the cathode of each of the LEDs 1 to 10 is not actually equal to each other. In the case of using LEDs emitting a red light, for example, the voltage $V_F$ varies in the range of 1.68 to 1.85 V. Accordingly, even when the resistance of the resistors 11 to 15 is made equal to each other with a high accuracy, there is generated a dispersion of the currents flowing through the LEDs 1 to 10, thus causing a dispersion of the light emission intensity of the LEDs 1 to 10.

Further, in the prior art optical reading device as shown in FIG. 17, an indication start position and an indication end position of the bar code or the like are located in the vicinity of the opposite ends of the detectable range on the media 22. In the case that the boundary between the indicated region (ranging from the indication start position to the indication end position) and the non-indicated region is detected, an average amplitude level of the analog signal waveform from the line sensor 23 becomes larger than that when the indicated region (the bar code) is detected. As a result, it is difficult to accurately process the waveform in the waveform processing circuit, resulting in an increase in reading error.

SUMMARY OF THE INVENTION

It is accordingly a first object of the present invention to provide an illumination type optical recorded information reading device which eliminates the above problem regarding the light emission intensity and the illuminance distribution due to the fluctuation in supply voltage and the dispersion of the electrical characteristic of the light emitting elements, and stabilize a light quantity for illumination and the illuminance distribution to improve the reading accuracy and the reading probability.

It is a second object of the present invention to provide an illumination type optical recorded information reading device which can obtain an accurately processed waveform of an analog signal from the photo detecting means to thereby improve the reading accuracy and the reading probability.

According to a first aspect of the present invention achieving the first object, there is provided an illumination type optical recorded information reading device comprising a plurality of light emitting elements (1 to 10) adapted to emit light by supplying thereto driving currents on the basis of a supply voltage ($V_{cc}$) of a common power supply (28); a media (16) adapted to be illuminated by said light emitting elements (1 to 10) as a light source, said media (16) having an optical indication (17) recorded thereon; photo detecting means (19, 20) for converting optical information from said media

(16) to electrical information (b); a plurality of driving elements (31 to 35) integrally formed on a semiconductor substrate connected in series through said light emitting elements (1 to 10 ) to said power supply (28); current detecting means (36) for outputting as a driving current detecting signal ($V_R$) a total amperage (I) of driving currents flowing through said driving elements (31 to 35) by supplying current to a series circuit having said driving elements (31 to 35), said power supply (28) and said light emitting elements (1 to 10); and control means (39) for comparing said driving current detecting signal ($V_R$) from said current detecting means (36) with a reference signal ($V_S$) for calculation of a reference current value to be supplied to said light emitting elements (1 to 10), and supplying a control signal ($\Delta V$) to said driving elements (31 to 35) so as to obtain a target light quantity from each of said light emitting elements (1 to 10); whereby said media (16) is stably illuminated by the light from each of said light emitting elements (1 to 10), and said electrical information (b) is accurately obtained from said photo detecting means (19, 20).

With this construction, the light emitting elements are arranged in parallel rows, and they are supplied with the DC supply voltage. A plurality of transistors as the driving elements are connected in series with the light emitting elements. When the supply voltage is applied to the light emitting elements, currents flow through the light emitting elements and the transistors. A total value of the currents flowing through the transistors is allowed to flow through a resistor as the current detecting means. A terminal voltage of the resistor is compared with a reference voltage in a differential amplifier circuit as the control means, and the transistors are controlled by the differential amplifier circuit so as to make a difference between the terminal voltage and the reference voltage constant. Accordingly, the currents flowing through the transistors and the light emitting elements can be maintained constant.

Even when the supply voltage is fluctuated, the currents flowing through the light emitting elements can be maintained constant to thereby prevent the fluctuation of the light emission intensity of the light emitting elements so far as a minimum value of the supply voltage required for light emission of the light emitting elements is applied thereto.

Furthermore, as the transistors are formed on the same semiconductor chip, they can be controlled by the common differential amplifier circuit, and the influence of temperature can be equally applied to the transistors. Accordingly, even when the temperature changes, there is no dispersion of the light emission quantity of the light emitting elements.

According to a second aspect of the present invention achieving the second object, there is provided an illumination type optical recorded information reading device comprising a media (1) having an optical indication (2) recorded thereon; photo detecting means (4, 5) for detecting a recorded surface of said media (1) in a predetermined maximum detectable range (W, W') and converting said optical indication (2) to electrical information; a light emitting element (3a) for supplying light for illuminating said maximum detectable range (W, W') of said photo detecting means (4, 5); and light conducting means (3) for conducting the light emitted from said light emitting element (3a) to said media (1); wherein a distribution of an illuminance of the light for illuminating said media (1) through said light conducting means (3) is set in such a manner that the illuminance at positions spaced away from a central portion of said maximum detectable range (W, W') is higher than the illuminance at said central portion, and that the illuminance at opposite end portions of said maximum detectable range is lower than the illuminance at said positions spaced away from said central portion.

With this construction, the illuminance at the positions spaced away from the central portion of the maximum detectable range by a line sensor as the photo detecting means is higher than that at the central portion, and the illuminance at the opposite end portions of the maximum detectable range is lower than that at the positions spaced away from the central portion. Accordingly, it is possible to reduce a difference in amplitude of the analog waveform signal to be output from the line sensor between in the case of detecting the boundary between the non-indicated region and the indicated region from the indication start position to the indication end position and in the case of detecting the indicated region. As a result, the analog waveform signal can be easily and accurately processed in the subsequent stage, thereby improving a success probability of reading.

Other objects and features of the invention will be more fully understood from the following detailed description and appended claims when taken with the accompanying drawings.

BRIEF DESCRIPTION OF THE DRAWINGS

FIGS. 3A to 3C are graphs of the detecting operation characteristics of the illumination type optical recorded information reading device according to the second aspect of the present invention;

FIG. 4 is a sectional view of a preferred embodiment of the light source in the illumination type optical recorded information reading device according to the second aspect of the present invention;

FIGS. 5A and 5B are graphs of an illuminance distribution by the light source shown in FIG. 4;

DETAILED DESCRIPTION OF THE PREFERRED EMBODIMENTS

There will now be described a preferred embodiment of the illumination type optical recorded information reading device according to the first aspect of the present invention with reference to FIGS. 1 and 2.

Figure 15:
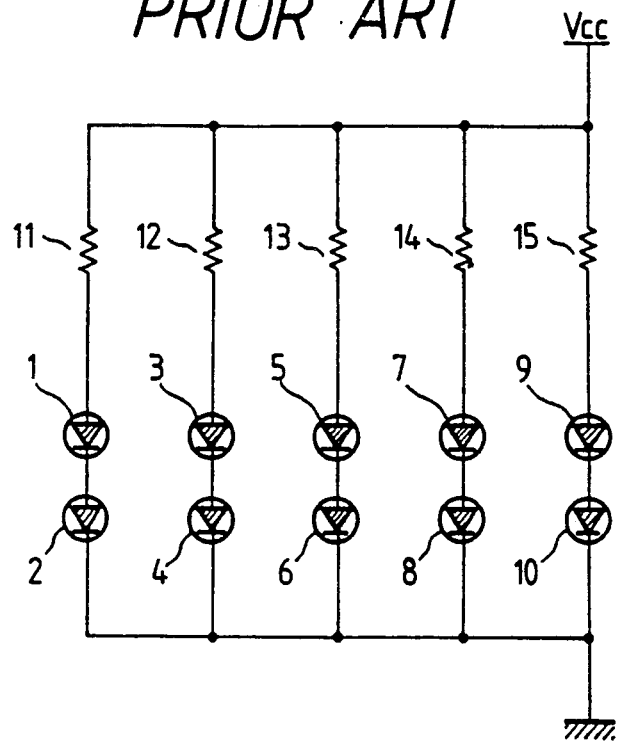
FIG. 15 is a circuit diagram of a light source driving circuit in the prior art.
Figure 17:
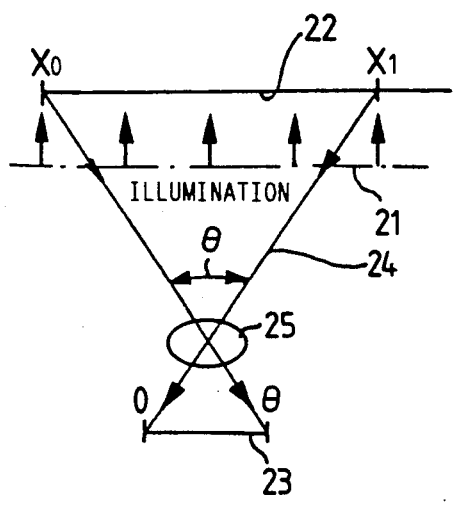
FIG. 17 is a schematic illustration of arrangement of an optical system in the prior art optical reading device.
Figure 16:
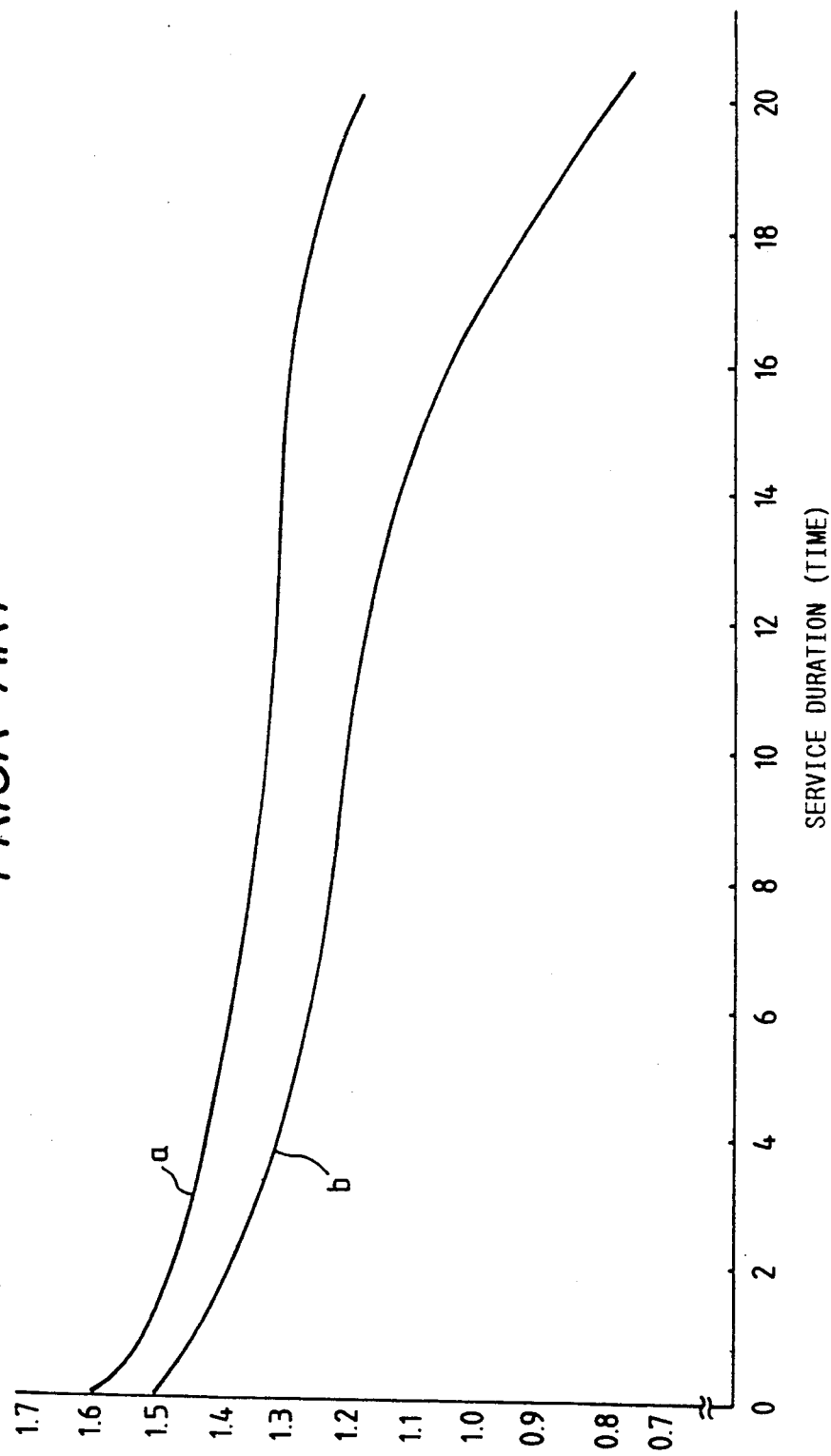
FIG. 16 is a graph showing an aged deterioration in output voltage of a dry cell used as the power supply in the prior art.

In the following description, detailed explanation of the same or corresponding parts as those mentioned with reference to FIGS. 15 and 16 will be omitted.

Figure 2:
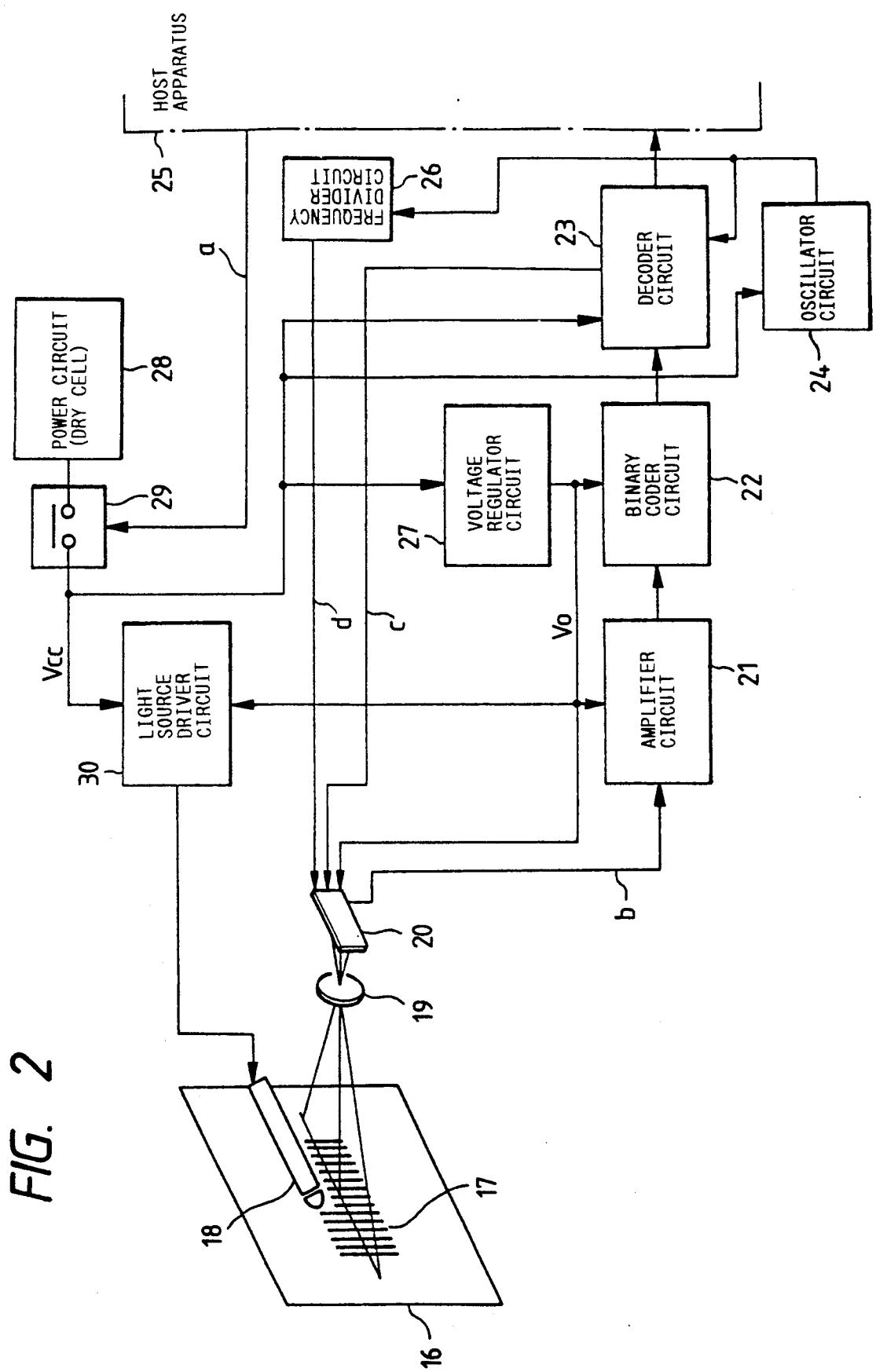
FIG. 2 is a block diagram of the general circuit construction of the illumination type optical recorded information reading device according to the first aspect of the present invention.

As shown in FIG. 2, the preferred embodiment includes a bar code media 16, bar code 17, light source 18, lens 19, line sensor 20, amplifier circuit 21, binary coder circuit 22, decoder circuit 23, oscillator circuit 24, host apparatus 25, frequency divider circuit 26, voltage regulator circuit 27, power circuit 28, switching circuit 29, and light source driver circuit 30.

When the line sensor 20 of a CMOS type or a CCD type is disposed in opposition to the bar code 17 on the bar code media 16, and a button (not shown) is operated by a user, a switch-on signal a is generated from the host apparatus 25 to turn on the switching circuit 29. As a result, a DC supply voltage $V_{cc}$ is applied from the power circuit 28 to the light source driver circuit 30, the decoder circuit 23, the oscillator circuit 24 and the voltage regulator circuit 27. Then, a constant voltage $V_o$ is generated from the voltage regulator circuit 27, and it is supplied to the line sensor 20, the amplifier circuit 21, the binary coder circuit 22 and the light source driver circuit 30.

When the supply voltage $V_{cc}$ is applied to the light source driver circuit 30, the circuit 30 starts the operation, and when the constant voltage $V_o$ is applied to the circuit 30, the circuit 30 supplies a current of a constant amperage to the light source 18 consisting of an LED array to be hereinafter described. Accordingly, the light source 18 uniformly illuminates an area of the bar code 17 on the bar code media 16 with a constant light emission intensity. A reflected light from the bar code media 16 is received by the line sensor 20 through the lens 19, and an image of the bar code 17 is formed on a detecting surface of the line sensor 20 by the lens 19. The light emission intensity of the light source is maintained constant by the light source driver circuit 30 even if the supply voltage $V_{cc}$ is fluctuated. This will be hereinafter described in detail.

At the same time when the switching circuit 29 is closed, the oscillator circuit 24 supplied with the supply voltage $V_{cc}$ generates a clock signal (which will be hereinafter referred to simply as a clock) having a preset constant period. This clock is supplied to both the decoder circuit 23 and the frequency divider circuit 26. The circuit 26 divides the clock to generate a driving clock d. Then, the driving clock d is supplied to the line sensor 20. When the decoder circuit 23 generates a start pulse c, the line sensor 20 scans the formed image of the bar code 17 in response to the driving clock d from the frequency divider circuit 26 at a timing of the start pulse c, and generates a video signal b having an amplitude varying with a difference in brightness of the formed image of the bar code 17. The video signal b is amplified in the amplifier circuit 21, and is then binary-coded in the binary coder circuit 22. Then, the binary-coded signal is supplied to the decoder circuit 23. The decoder circuit 23 decodes the bar code 17 according to the clock from the oscillator circuit 24. A signal indicative of a decoded result is supplied to the host apparatus 25.

A preferred embodiment of the light source driver circuit 30 shown in FIG. 2 will now be described with reference to FIG. 1. The circuit 30 includes transistors 31 to 35, resistors 36 to 38, differential amplifier circuit 39 and input terminals 40 and 41.

Figure 1:
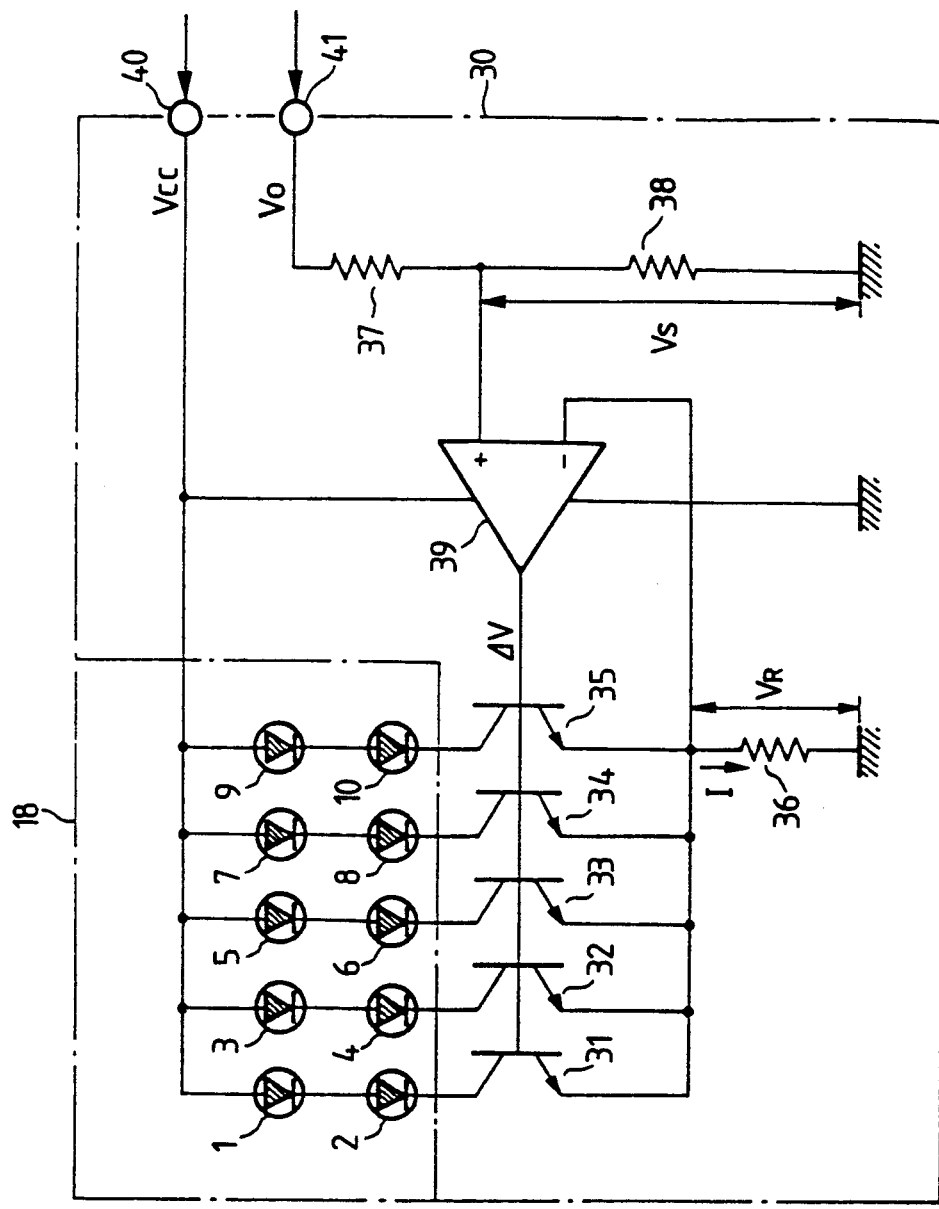
FIG. 1 is a circuit diagram of a light source driving circuit in the illumination type optical recorded information reading device according to the first aspect of the present invention.

As shown in FIG. 1, the supply voltage $V_{cc}$ is supplied from the power circuit 25 (see FIG. 2) through the switching circuit 29 (see FIG. 2) to the input terminal 40 of the light source driver circuit 30. Then, the supply voltage $V_{cc}$ is supplied to the light source 18. The light source 18 is constructed of an LED array consisting of a plurality of LEDs 1 to 10 as light emitting elements arranged in predetermined rows. That is, the LEDs 1 and 2 are connected in series; the LEDs 3 and 4 are connected in series; the LEDs 5 and 6 are connected in series; the LEDs 7 and 8 are connected in series; and the LEDs 9 and 10 are connected in series. In the light source driver circuit 30 supplied with the supply voltage $V_{cc}$, the supply voltage $V_{cc}$ is directly applied to anodes of the LEDs 1, 3, 5, 7 and 9 provided in the light source 18.

Cathodes of the LEDs 2, 4, 6, 8 and 10 are connected to collectors of the transistors 31 to 35, respectively. Emitters of the transistors 31 to 35 are connected to one of terminals of the resistor 36. The other terminal of the resistor 36 is grounded.

When the supply voltage $V_{cc}$ is applied to the anodes of the LEDs 1, 3, 5, 7 and 9, currents flow through the LEDs 1 to 10 to the transistors 31 to 35, and a total current I of these currents flows through the resistor 36. A terminal voltage $V_R$ of the resistor 36 to be generated by the total current I is supplied to an inversion input of the differential amplifier circuit 39. On the other hand, the constant voltage $V_o$ supplied from the voltage regulator circuit 27 to the input terminal 41 is divided by the resistors 37 and 38 to obtain a partial voltage as a reference voltage $V_s$. The reference voltage $V_s$ is supplied to a non-inversion input of the differential amplifier circuit 39. The differential amplifier circuit 39 generates a voltage $\Delta V$ corresponding to a difference between the reference voltage $V_s$ and the terminal voltage $V_R$, and changes a base current of the transistors 31 to 35 according to the voltage $\Delta V$.

That is, the differential amplifier circuit 39 controls the base current of the transistors 31 to 35 so as to make the difference between the reference voltage $V_s$ and the terminal voltage $V_R$ become zero. In the case where the supply voltage $V_{cc}$ is fluctuated to increase the total current I flowing through the resistor 36 and result in $V_R > V_s$, the differential amplifier circuit 39 changes the base current of the transistors 31 to 35 so as to reduce an emitter current of the transistors 31 to 35. Conversely, in the case of $V_R < V_s$, the differential amplifier circuit 39 changes the base current of the transistors 31 to 35 so as to increase the emitter current of the transistors 31 to 35. Thus, the differential amplifier circuit 39 maintains the condition of $V_R=V_s$ irrespective of the fluctuation in the supply voltage $V_{cc}$, and maintains the emitter current of the transistors 31 to 35 constant. Accordingly, the currents flowing through the LEDs 1 to 10 are maintained constant. The transistors 31 to 35 are formed on the same semiconductor chip, and have substantially the same driving characteristic since temperature conditions of the transistors 31 to 35 are substantially equal to each other.

Assuming that an amperage of the current flowing through each of the LEDs 1 to 10 is 20 mA, and the resistance of the resistor 36 is 2Ω, an amperage of the total current I flowing through the resistor 36 becomes 20 mA×5=100 mA, and the terminal voltage $V_R$ of the resistor 36 becomes 100 mA×2Ω=0.2 V. To maintain this condition, the reference voltage $V_s$ is set to 0.2 V which is equal to the terminal voltage $V_R$ of the resistor 36. A voltage $V_F$ between the anode and the cathode of each of the LEDs 1 to 10 to be required for light emission of the LEDs 1 to 10 is about 1.7 V, and a voltage between the collector and the emitter of each of the transistors 31 to 35 is small enough to be ignored. Therefore, a minimum value of the supply voltage $V_{cc}$ to be required for light emission of the LEDs 1 to 10 becomes $V_R+2\times V_F=0.2+2\times1.7=3.6$ V. That is, until the supply voltage $V_{cc}$ decreases to 3.6 V, the amperage of the current flowing through each of the LEDs 1 to 10 is maintained at a constant value of 20 mA irrespective of the fluctuation of the supply voltage $V_{cc}$. Accordingly, the light emission intensity of the LEDs 1 to 10 is maintained constant.

In this manner, by setting the resistance of the resistor 36 to a low value, the amperage of the current flowing through each of the LEDs 1 to 10 can be maintained constant even though the supply voltage $V_{cc}$ becomes low. Furthermore, even though the LEDs 1 to 10 have a variation in applied voltage—light emission driving current characteristic, or the supply voltage $V_{cc}$ changes to decrease as a service time proceeds from a power-on timing in accordance with the service time—output voltage characteristic of the dry cell as mentioned with reference to FIG. 16, or the operational conditions of the LEDs 1 to 10 and the transistors 31 to 35 are fluctuated with a change in peripheral temperature, the light emission intensity of the LEDs 1 to 10 can be maintained constant.

Further, as the transistors 31 to 35 having the same characteristic are formed on the same semiconductor chip, they can be simultaneously controlled by the differential amplifier circuit 39 with a simple wiring, and the influence due to temperature can be made identical for all the transistors 31 to 35. Accordingly, there is no variation in characteristic of the transistors 31 to 35 irrespective of a temperature change, and therefore there is no variation in light emission quantity of the LEDs 1 to 10.

Although the number of the LEDs in the light source 18 is twelve, and every two of the LEDs are connected in series in the above preferred embodiment, the present invention is not limited to the above. Further, the amperage of the current flowing through each LED is set to 20 mA, and the resistance of the resistor 36 is set to 2Ω in the above preferred embodiment, these set values are merely exemplary. Further, the light emitting element in the light source is not limited to LED. Moreover, it is to be easily understood that the present invention can be applied to control of a light source in any arbitrary devices other than the bar code reading device.

Additionally, it is to be noted that the constitutional elements of the present invention may be replaced by any similar elements within design modification to be easily made by those skilled in the art. For example, the line sensor 20 may be replaced by any other photo detecting means such as an image sensor capable of sequentially reading information; the NPN type transistors 31 to 35 may be replaced by any other driving elements such as an unipolar type semiconductor device; the current detecting resistor 36 may be replaced by any other current detecting means; and the 2-input terminal type operational amplifier 39 may be replaced by any other control means for controlling the driving elements with a constant current.

There will now be described a preferred embodiment of the illumination type optical recorded information reading device according to the second aspect of the present invention with reference to FIGS. 3 to 14.

In the following description, detailed explanation of the same or corresponding parts as those mentioned with reference to FIGS. 17 and 18A to 18D will be omitted.

As shown in FIGS. 3 to 14, the preferred embodiment includes a bar code media 1, bar code 2, light source 3 including LEDs 3a and lens 3b as a light conducting means, light receiving lens 4, line sensor 5, DC amplifier circuit 6, AC amplifier circuit 7, binary coder circuit 8, decoder 9, voltage regulator circuit 10, frequency divider circuit 11, clock circuit 12, power circuit 13, and driver circuit 14.

Figure 14:
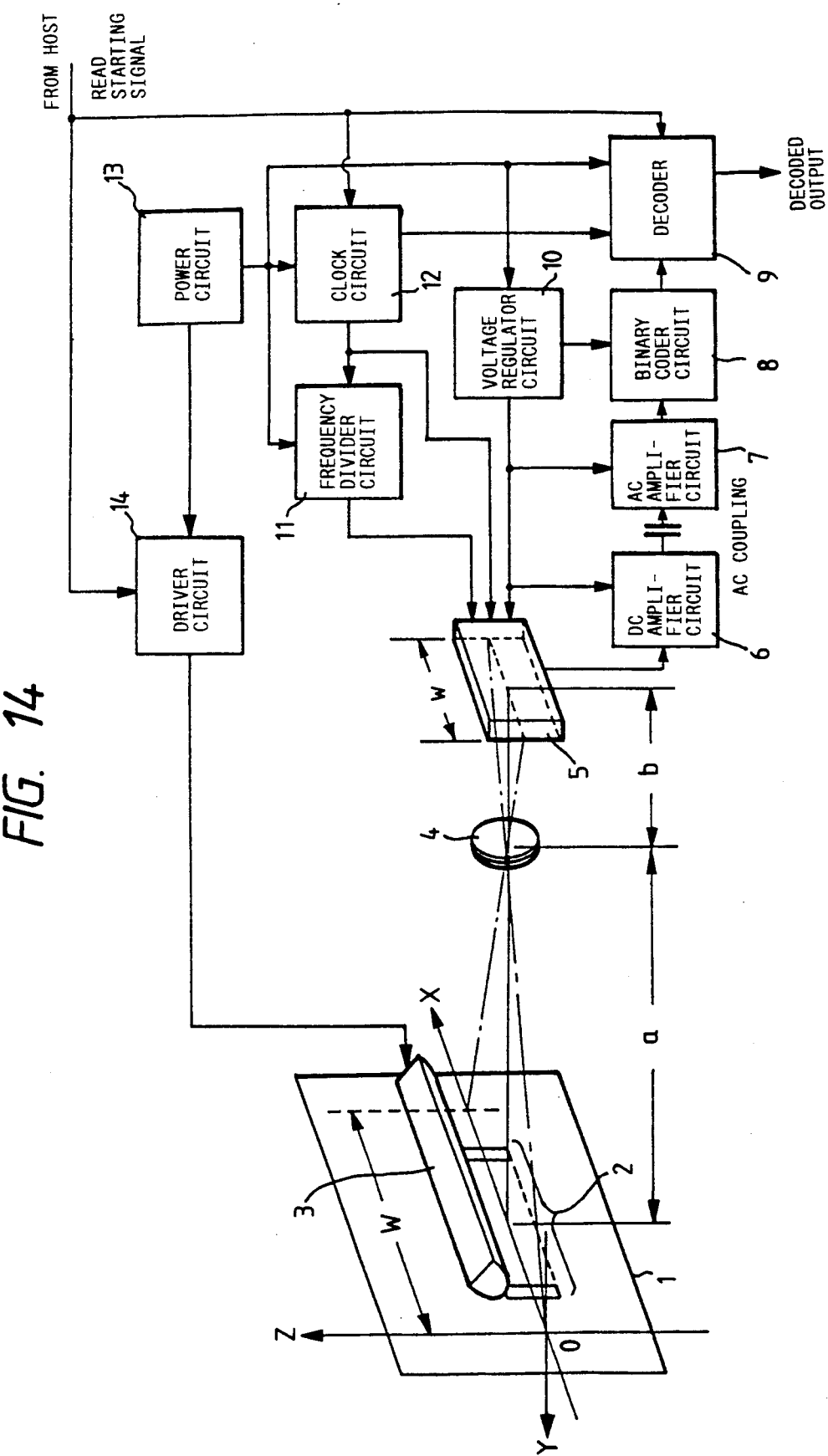
FIG. 14 is a block diagram of the general circuit construction of the illumination type optical recorded information reading device according to the second aspect of the present invention.

Referring to FIG. 14, the light source 3 is so located as to illuminate the bar code 2 and its given peripheral area on the bar code media 1. A reflected light from the surface of the media 1 is received through the lens 4 as a reduction optical system by the line sensor 5 including a plurality of CMOS type or CCD type photo detecting elements arranged in rows. The power circuit 13 is connected to the driver circuit 14, the clock circuit 12, the decoder 9, the voltage regulator circuit 10, and the frequency divider circuit 11 to supply power thereto. A read starting signal output from a host computer (not shown) according to operation of a push button or the like (not shown) by an operator is simultaneously input into the driver circuit 14, the clock circuit 12 and the decoder 9. These circuits 9, 12 and 14 to which the read starting signal is input are constructed in such a manner that the driver circuit 14 supplied with power from the power circuit 13 supplies a driving current of a constant amperage to the light source 3 so as to obtain a predetermined illuminance for a predetermined period of time; the clock circuit 12 supplied with power from the power circuit 13 starts a counting operation from an initial value; and the decoder 9 supplied with power from the power circuit 13 is reset to a condition where it can start a decoding operation.

The voltage regulator circuit 10 stabilizes a charging voltage to be applied to the line sensor 5, an amplifying voltage to be applied to the DC amplifier circuit 6, an amplifying voltage to be applied to the AC amplifier circuit 7, and a binary coding voltage to be applied to the binary coder circuit 8.

The frequency divider circuit 11 supplied with power from the power circuit 13 divides a clock pulse supplied from the clock circuit 12 and supplies a detection command signal to the line sensor 5 so as to indicate a reading period corresponding to the number of photo detecting elements (photo transistors) in the line sensor 5 and a cycle period of the clock pulse (which will be hereinafter referred to simply as clock) from the clock circuit 12 and also indicate a charging period for changing a light quantity exposed by a reflected light into a voltage signal. When the line sensor 5 inputs the detection command pulse signal indicative of the charging period from the frequency divider circuit 11 and a clock pulse from the clock circuit 12, a present charge in each charging element (semiconductor capacitor) connected to each photo detecting element is reset to an initial value. Just thereafter, a charging voltage is applied to all the photo detecting elements for only a period corresponding to a time while the detection command pulse signal is being supplied. In this condition, the line sensor 5 supplies a charging current corresponding to a light quantity detected by each photo detecting element to each charging element without dependency upon the clock pulse supplied from the clock circuit 12. When the line sensor 5 inputs the detection command pulse signal indicative of the reading period from the frequency divider circuit 11 and the clock pulse from the clock circuit 12, a voltage corresponding to a charge quantity supplied to each charging element is sequentially output to the DC amplifier circuit 6 at a scanning period corresponding to a period of the clock pulse supplied from the clock circuit 12.

A weak analog waveform signal sequentially read from the line sensor 5 is amplified to a predetermined power in the DC amplifier circuit 6, and is then sequentially supplied through an AC coupling capacitor for cutting off a direct current to the AC amplifier circuit 7. The AC amplifier circuit 7 supplies to the binary coder circuit 8 an amplified signal corresponding to an AC component of the analog waveform signal output from the line sensor 5. The binary coder circuit 8 includes a known waveform shaping means for clamping upper and lower peaks of an amplified value of the AC component of the analog waveform signal amplified according to a level of a reflectance on the surface of the media 1. The clamped AC signal is binary-coded at a predetermined threshold voltage to obtain a binary-coded signal of "H" and "L" levels. The binary-coded signal is output to the decoder 9. The decoder 9 counts a continuous time of the "H" and "L" levels of the binary-coded signal on the basis of a clock pulse supplied from the clock circuit 12, and sequentially decodes the binary-coded signal according to the count value to convert image data to character data. A decoded result obtained in the decoder 9 is output to the host apparatus.

The light source 3 having an LED array composed of a plurality of LEDs arranged in rows illuminates the surface of the media 1 in a detectable range W to be detected by the line sensor 5. FIG. 3A shows an illuminance distribution of the light source 3 in the detectable range W. In comparison with the conventional illuminance distribution shown in FIG. 18A, the illuminance distribution shown in FIG. 3A is similar in the point that an illuminance at the central portion of the detectable range W is lower than that at the opposite ends. However, the illuminance distribution shown in FIG. 3A differs from that shown in FIG. 18A in that a maximum illuminance is provided at two positions shifted a slight distance $X_o$ from the opposite ends of the range W to the central portion, and that the illuminance at the opposite ends of the range W is lower than that at the above two positions. FIG. 3B shows a detected illuminance distribution of the reflected light from the media 1 as detected by the line sensor 5, provided that the reflectance of the media 1 is fixed. In comparison with the conventional detected illuminance distribution shown in FIG. 18B, the detected illuminance distribution shown in FIG. 3B is similar in the point that an illuminance is gradually reduced toward the opposite ends of a detected range w of the line sensor 5. However, the detected illuminance distribution shown in FIG. 3B differs from that shown in FIG. 18B in that the illuminance distribution at the central portion of the detected range w is flat, and differs from that shown in FIG. 18C in that the illuminance is gradually reduced toward the opposite ends of the detected range w. FIG. 3C shows a change in amplitude of the analog waveform signal output from the line sensor 5 detecting a non-indicated region having a high average reflectance in the detectable range W on the media 1 and an indicated region having a low average reflectance where the bar code 2 is indicated. In comparison with the conventional analog waveform signal shown in FIG. 18D, a difference between the amplitude E at the time when the boundary between the non-indicated region and the indicated region is detected and the amplitude e at the time when the indicated region is detected from a start position to an end position of the bar code 2 as shown in FIG. 3C is smaller than that shown in FIG. 18D.

Now, the reading operation of the optical reading device will be described in more detail with reference to FIGS. 9 to 13.

Figure 9:
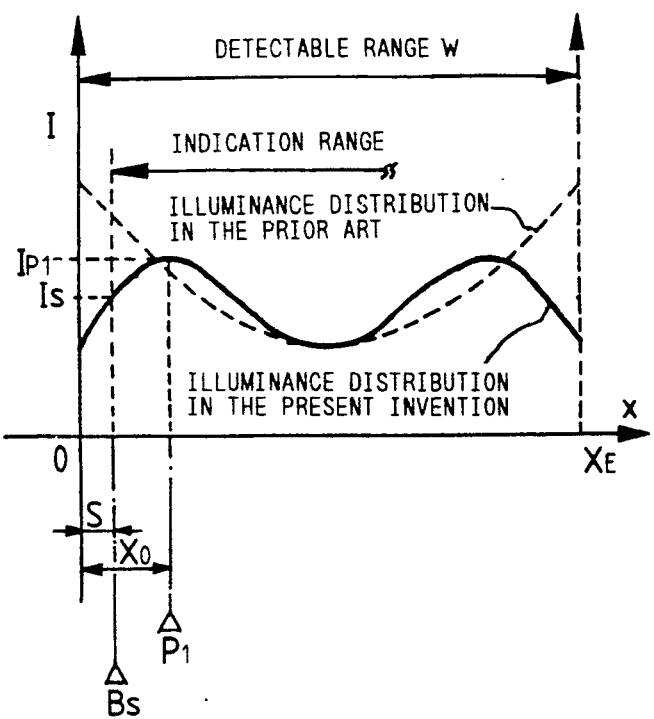
FIG. 9 is a graph showing the relationship between an illuminance and a detecting position on the recorded surface of the media.
Figure 18A:
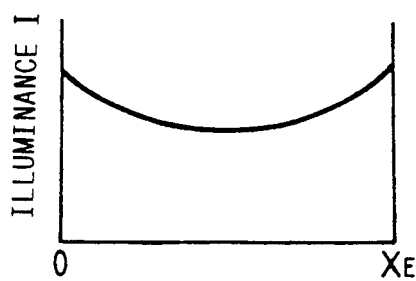
FIGS. 18A to 18D are graphs of the detecting operation characteristics of the prior art optical reading device.
Figure 18B:
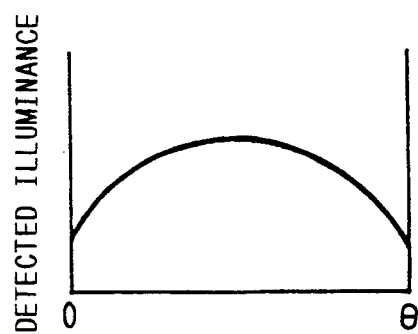
Figure 18C:
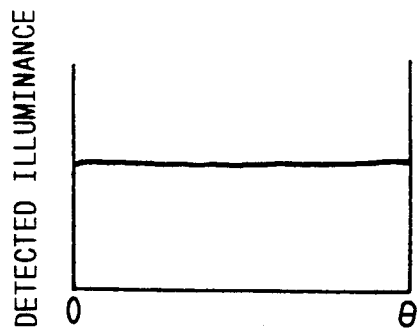
Figure 18D:
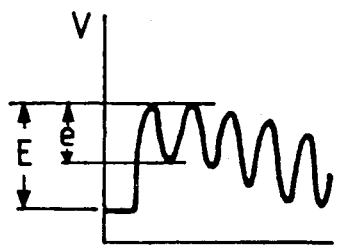

FIG. 9 shows the relationship between the illuminance distribution and the indicated position on the media 1. In FIG. 9, the illuminance distribution in the present invention as previously mentioned with reference to FIG. 3A is shown by a solid line, while the illuminance distribution in the prior art as previously mentioned with reference to FIG. 18A is shown by a dashed line.

A detectable range W on the media 1 to be detected by the line sensor 5 exists between a position O and a position $X_E$ on a horizontal axis X shown in FIG. 9. As shown by the solid line having a pair of peaks in FIG. 9, there exist two maximum illuminances $I_{p1}$ and $I_{p2}$ at two positions $P_1$ and $P_2$ near the opposite limited detectable positions O and $X_E$, respectively, within the detectable range W. In the case where a distance between the line sensor 5 and the media 1 is set to a standard distance, a distance $X_{o1}$ between the limited position O and the maximum illuminance position $P_1$ becomes about 15 mm, and a distance $X_{o2}$ between the limited position $X_E$ and the maximum illuminance position $P_2$ becomes similarly about 15 mm. Further, there exists an indication start position $B_{s1}$ between the limited position O and the maximum illuminance position $P_1$, wherein an illuminance $I_{s1}$ lower than the maximum illuminance $I_{p1}$ appears at the indication end position $B_{s1}$. Similarly, there exists an indication end position $B_{s2}$ between the limited position $X_E$ and the maximum illuminance position $P_2$, wherein an illuminance $I_{s2}$ lower than the maximum illuminance $I_{p2}$ appears at the indication end position $B_{s2}$. In the case where the indication on the media 1 as a bar code, a start bit bar is indicated at the indication start position $B_{s1}$, and a stop bit bar is indicated at the indication end position $B_{s2}$. Between the indication start position $B_{s1}$ and the indication end position $B_{s2}$, a plurality of spaces and bars indicative of data contents are indicated. The line sensor 5 is disposed so that the range between the indication start position $B_{s1}$ and the indication end position $B_{s2}$ is located within the detectable range W from the limited position O to the limited position $X_E$, with the result that all the contents of the indication on the media 1 can be detected. The indicated region on the media 1 is positioned so that a distance $S_1$ between the indication start position $B_{s1}$ and the limited position O is shorter than or equal to the distance $X_{o1}$ between the maximum illuminance position $P_1$ and the limited position O, and that a distance $S_2$ between the indication end position $B_{s2}$ and the limited position $X_E$ is shorter than or equal to the distance $X_{o2}$ between the maximum illuminance position $P_2$ and the limited position $X_E$. As a result, the success probability of reading can be improved.

Figure 10:
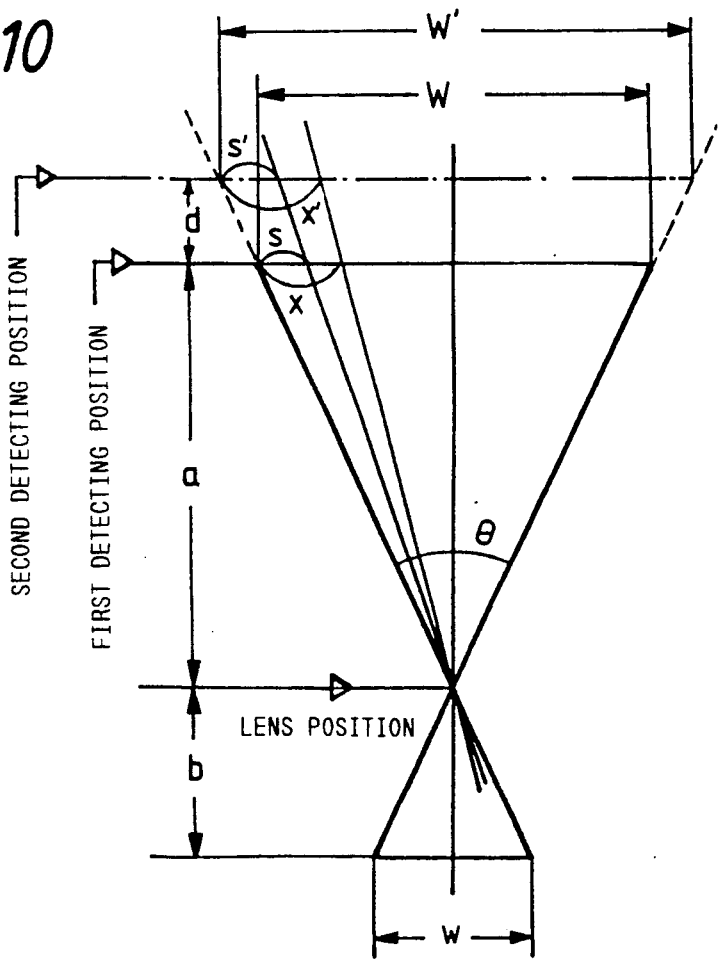
FIG. 10 is a schematic illustration of the optical arrangement of the photo detecting means.

Referring to FIG. 10, the detected range w of the line sensor 5 is defined by a given reading angle $\theta$ to be formed about the lens 4 located at a lens position shown in FIG. 10 and having a given condensing characteristic and a given distance b between the line sensor 5 and the lens 4. Letting m denotes a reduction rate of the lens 4, a standard distance a between the lens 4 and a first detecting position on the media 1 is related to the distance b by the following equation (3).

$$m = b/a \quad (3)$$

The reduction rate m is set to about 0.25, for example, on the basis of the detected range w of the line sensor 5 so that an operator can hold the optical reading device with a single hand. The detectable range W at the first detecting position as a standard position on the media 1 is given by the following equation (4), wherein the range W is proportional to the distance a with the reading angle $\theta$ defined as a constant.

$$W = 2 \cdot a \cdot \tan(\theta/2) \quad (4)$$

In the case that the first detecting position is moved away by a limited distance d to provide a second detecting position where the line sensor 5 can detect the indication on the media 1 even if defocusing, a detectable range W' at the second detecting position is given by the following equation (5), wherein the range W' is proportional to the sum of the distances a and d with the reading angle $\theta$ defined as a constant.

$$W' = 2 \cdot (a+d) \cdot \tan(\theta/2) \quad (5)$$

In this case, the line sensor 5 is disposed so that a distance S' between an indication start position $B_{s'}$ and a limited position O' is made shorter than or equal to a distance $X_{o'}$ between a maximum illuminance position $P_{1'}$ and the limited position O'. As a result, the success probability of reading can be similarly improved.

Figure 13:
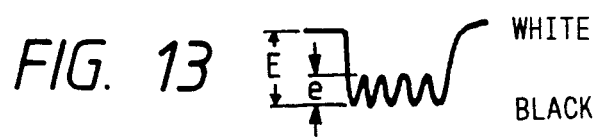
FIG. 13 is a waveform chart showing a polarity of the signal from an AC amplifier circuit in the illumination type optical recorded information reading device.

In reading the bar code 2 indicated on the media 1 with use of the optical reading device, the analog signal to be supplied through the AC coupling capacitor to the AC amplifier circuit 7 is shown in FIG. 13, wherein a white level corresponding to the indication of the spaces becomes a high voltage, and a black level corresponding to the indication of the bars becomes a low voltage.

Figure 11A:
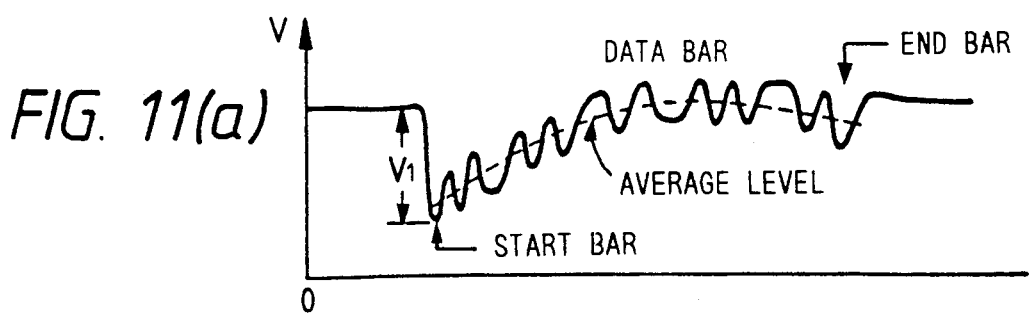
FIGS. 11A and 11B are waveform charts of an analog output signal from the line sensor in the prior art and the present invention, respectively.
Figure 11B:
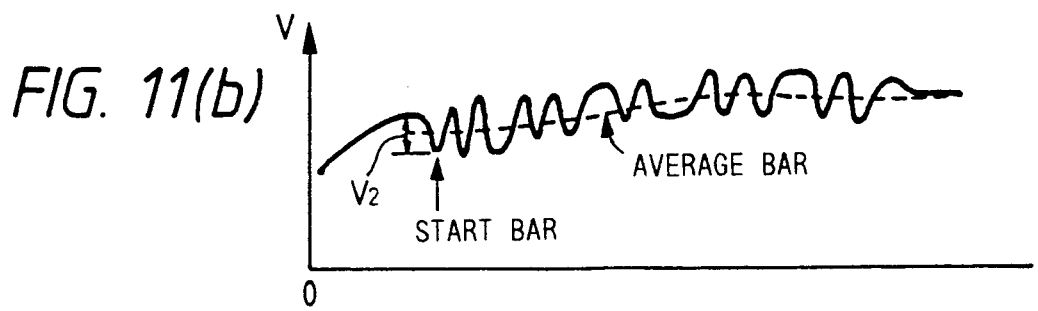

FIG. 11A shows a waveform of the analog signal obtained by the prior art optical reading device exhibiting the illuminance distribution as shown by the dashed line in FIG. 9. On the other hand, FIG. 11B shows a waveform of the analog signal obtained by the optical reading device of the present invention exhibiting the illuminance distribution as shown by the solid line in FIG. 9. As apparent from FIGS. 11A and 11B, an average change rate of an average level of the waveform shown by a dashed line in FIG. 11B is smaller than that shown by a dashed line in FIG. 11A. A difference in average change rate between in FIGS. 11A and 11B is directly dependent on a difference in voltage change between $V_1$ in FIG. 11A and $V_2$ in FIG. 11B, which voltage change is generated at the boundary between the non-indicated region and the indicated region on the media 1. That is, the voltage change $V_2$ to be generated upon illuminating the boundary with a relatively low illuminance according to the present invention is remarkably smaller than the voltage $V_1$ to be generated upon illuminating the boundary with a relatively high illuminance in the prior art.

Figure 12:
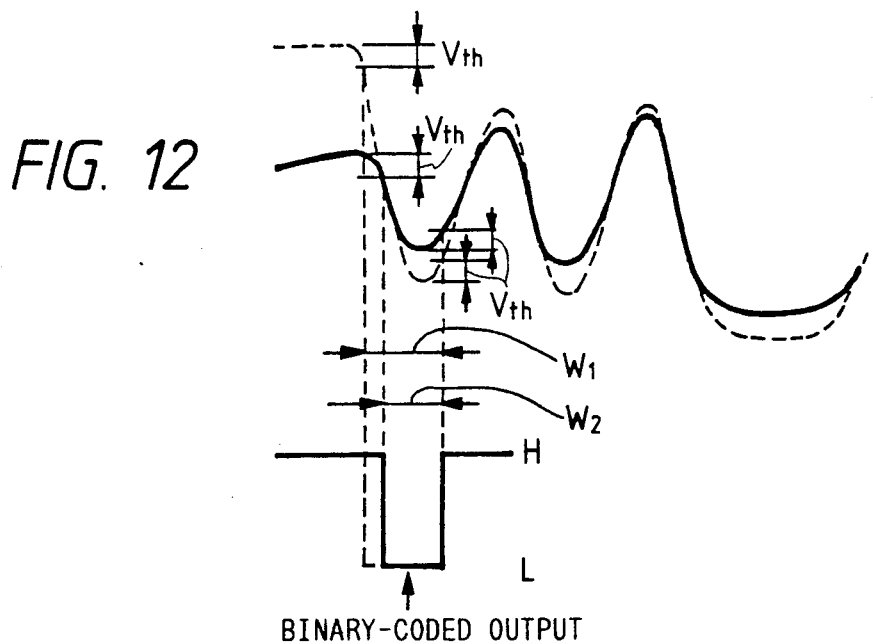
FIG. 12 is a waveform chart showing a waveform shaping operation of the analog output signal from the line sensor.

FIG. 12 shows a difference in pulse width of a binary-coded output to be generated from the binary coder circuit 8 in correspondence with the analog signal between the prior art (shown by a dashed line) and the present invention (shown by a solid line). The binary-coded output is changed from H to L at a timing when a level of the output voltage from the AC amplifier circuit 7 passes a given threshold voltage $V_{th}$. That is, as apparent from FIG. 12, a pulse width $W_1$ of the binary-coded output shown by the dashed line to be obtained from the large voltage change $V_1$ on the basis of the threshold voltage $V_{th}$ is longer than a pulse width $W_2$ of the binary-coded output shown by the solid line to be obtained from the small voltage change $V_2$ on the basis of the threshold voltage $V_{th}$. Although this result obtained in FIGS. 11A and 11B and FIG. 12 is referred on the side of the reading start position shown by the limited position O in FIG. 9, the same result is similarly obtained on the side of the reading end position shown by the limited position $X_E$ in FIG. 9. Accordingly, the probability of decoding error to be generated in the decoder 9 receiving the binary-coded output from the binary coder circuit 8 can be made remarkably lower in the case of decoding the binary-coded output having the short pulse width $W_2$ than in the case of decoding the binary-coded output having the long pulse width $W_1$.

Figure 6:
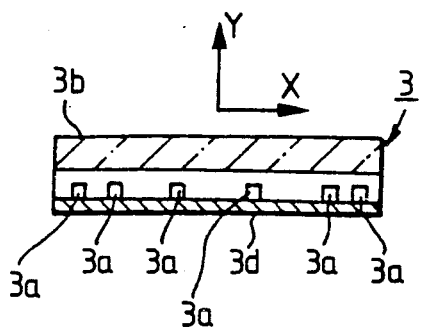
FIG. 6 is a view similar to FIG. 4, showing another preferred embodiment of the light source.

FIG. 6 shows a preferred embodiment of the light source 3 to be used in the optical reading device improved in the success probability of decoding as mentioned above. Referring to FIG. 6, a plurality of LEDs 3a are arranged on a wiring board 3d at irregular intervals in an X-direction (i.e., a reading direction of the line sensor 5 as shown in FIG. 14). The irregular intervals of the LEDs 3a are set in such a manner that the interval of some of the LEDs 3a on the central portion of the wiring board 3d corresponding to the central portion of the detectable range W to be detected by the line sensor 5 is relatively large, and that the interval of the other LEDs 3a on the opposite end portions of the wiring board 3d is relatively small. A semi-cylindrical light conductor 3b for condensing the light from the LEDs 3a is mounted on the LEDs 3a in a Y-direction (light emitting direction) perpendicular to the X-direction. The light conductor 3b has a uniform semi-circular cross section taken in a plane perpendicular to an X-Y plane defined by the X-direction and the Y-direction.

Figure 7:
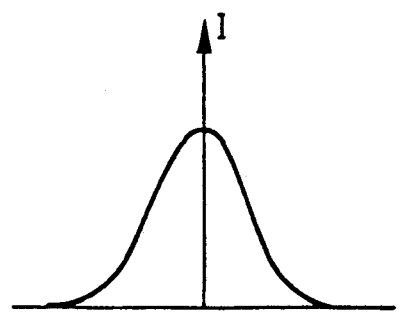
FIG. 7 is a graph of an illuminance distribution by a single LED.
Figure 8A:
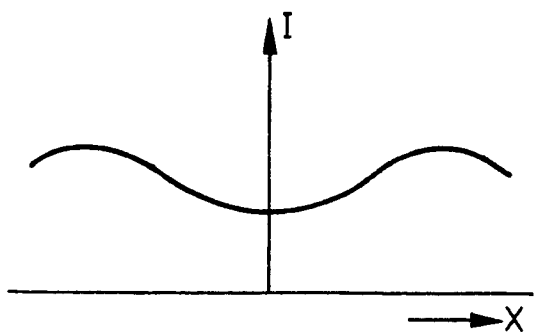
FIGS. 8A to 8C are graphs of an illuminance distribution by the light source shown in FIG. 6.

FIG. 8A shows an illuminance distribution of the light to be emitted from the light source 3 shown in FIG. 6. As apparent from FIG. 8A, the illuminance distribution is similar to that shown in FIG. 3A and FIG. 9 (solid line). FIG. 7 shows an illuminance distribution of the light to be emitted from the single LED $3a$, wherein the illuminance distribution curve is symmetrical with respect to a maximum illuminance existing at the central position. In the case of changing a distance between the media 1 and the LED $3a$, the illuminance distribution curve is changed in the following manner. That is, when the distance is short, the illuminance distribution is sharp such that the illuminance at the central portion is high, and it is rapidly lowered toward the opposite end portions, while when the distance becomes long, the illuminance distribution curve becomes gentle such that the illuminance at the central portion becomes low, and it is gradually lowered toward the opposite end portions.

Figure 8B:
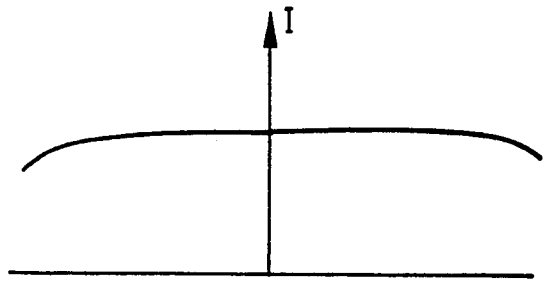
Figure 8C:
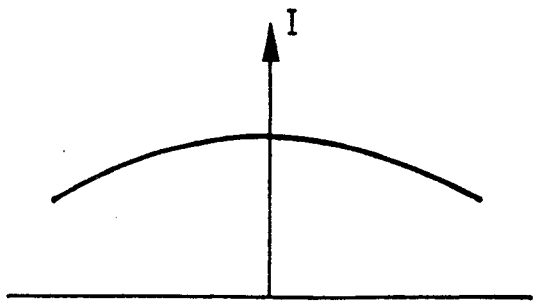

Accordingly, the illuminance distribution of the light from the light source 3 constructed of the plural LEDs $3a$ having the above distance-illuminance distribution changing characteristic is changed with a change in the distance between the media 1 and the light source 3 in the following manner. That is, when the distance is small, the illuminance distribution curve is a curve having two peaks as shown in FIG. 8A. When the distance is increased, the illuminance distribution curve becomes a curve such that the illuminance at the central portion is flattened, and it is gradually lowered at the opposite end portions as shown in FIG. 8B. When the distance is further increased, the illuminance distribution curve becomes a curve such that the illuminance is gradually lowered from the central portion to the opposite end portions as shown in FIG. 8C. In the optical reading device employing the light source 3 having the above distance-illuminance distribution changing characteristic, a detected illuminance of the reflected light to be detected by the line sensor 5 becomes higher at the central portion of the detected range w than at the opposite end portions as the distance between the media 1 and the line sensor 5 increases. Accordingly, when the distance between the media 1 and the line sensor 5 is large, there is a possibility of decoding error in the decoder 9 frequently occurring.

The above-mentioned tendency similarly occurs in the case that the plural LEDs $3a$ are arranged at regular intervals, and the semi-cylindrical light conductor $3b$ is opposed to the plural LEDs $3a$, and a driving current to be supplied to the LEDs $3a$ at the central portion is made smaller than that to be supplied to the LEDs $3a$ at the opposite end portions.

FIG. 4 shows another preferred embodiment of the light source 3 capable of maintaining a success probability of reading within a certain range even though the distance between the media 1 and the line sensor 5 is increased. The light source 3 shown in FIG. 4 is different from that shown in FIG. 6 in that the condensing characteristic of the light conductor $3b$ in the X-direction is improved. That is, the light conductor $3b$ shown in FIG. 4 is formed with a plurality of lens portions $3c_1$, $3c_2$ and $3c_3$ forming a Fresnel lens, and the lens portions $3c_1$, $3c_2$ and $3c_3$ are opposed to the plurality LEDs $3a$, respectively. That is, the LEDs $3a$ are arranged at irregular intervals in the X-direction in such a manner that the interval becomes smaller from the central portion to the opposite end portions, and the same driving current is supplied to the LEDs $3a$. On the other hand, the lens portions $3c_1$, $3c_2$ and $3c_3$ are so formed as to correspond to the pitch of arrangement of the LEDs $3a$ and face the corresponding LEDs $3a$. The lens portions $3c_1$ and $3c_2$ located in the vicinity of the opposite ends of the light source 3 provides an angle of refraction of the light from the corresponding LEDs $3a$ greater than that to be provided by the lens portions $3c_3$ located at the central portion of the light source 3.

FIG. 5A shows an illuminance distribution to be obtained by the light source 3 shown in FIG. 4 in the case that the line sensor 5 is opposed to the media 1 at a standard distance. FIG. 5B shows an illuminance distribution to be obtained by the light source 3 shown in FIG. 4 in the case that the distance between the line sensor 5 and the media 1 is increased to the standard distance a plus the distance d as shown in FIG. 10. As apparent from FIG. 5B, an illumination range is widened, and an absolute illuminance is generally lowered with the illuminance distribution having two peaks being maintained as similar to that shown in FIG. 5A.

Accordingly, even when a indication range from the indication start position to the indication end position is wide, and the distance between the line sensor 5 and the media 1 is increased, the boundary between the indicated region and the non-indicated region can be properly read according to the illuminance distribution as shown in FIG. 5B, thereby obtaining a good decoding result with a low probability of decoding error.

Although the above-mentioned preferred embodiments employ the line sensor 5 and a reduction lens 4 located before the line sensor 5 as the photo detecting means, the present invention is not limited to such means. That is, it is sufficient that the media 1 is to be illuminated over the non-indicated region to the indicated region with the illuminance distribution according to the present invention, and that the detected values are to be resultantly processed in the decoding order of the content of the indication. For example, the read scanning system may be a galvano mirror system using a single photo detecting element, or a system for reading data in a given order from a photo detecting solid device having a plurality of photo detecting elements arranged in rows.

Further, although the light source in the above preferred embodiments is so constructed as to simultaneously illuminate the media, it may be constructed so as to successively illuminate the media in accordance with a scanning speed and direction of the photo detecting means.

As described above, according to the first aspect of the present invention, even when the supply voltage is reduced, the light emission intensity of the light source can be maintained constant. Further, even when the supply voltage is fluctuated, or there is a dispersion of characteristics of the light emitting elements, the light emission intensity of the light source is not fluctuated. Accordingly, even in the case of using a dry cell as the power supply and operating the same for a long time, the light emission of the light source can be maintained constant.

Furthermore, as the transistors for limiting the currents flowing the light emitting elements are formed on the same semiconductor chip, the characteristics of the transistors are not varied with a temperature change. Accordingly, even when temperature changes, the light emission intensity of each light emitting element can be made equal to each other.

Another to the second aspect of the present invention, the illuminance at the opposite ends of the indicated region having a low average reflectance is made higher than or equal to the illuminance in the non-indicated region having a high average reflectance. Accordingly, in the case of detecting the boundary between the non-indicated region and the indicated region, the fluctuation in detection signal level at the boundary can be reduced. As a result, it is not necessary to provide a complicated processing circuit for eliminating the influence of the fluctuation. Thus, a stable decoding operation can be carried out with a simple circuit construction to thereby reduce a probability of decoding error.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An illumination type optical recorded information reading device comprising:

a plurality of light emitting elements (1 to 10) adapted to emit light by supplying thereto driving currents on the basis of a supply voltage ($V_{cc}$) of a common power supply (28);

a media (16) adapted to be illuminated by said light emitting elements (1 to 10) as a light source, said media (16) having an optical indication (17) recorded thereon;

photo detecting means (19, 20) for converting optical information from said media (16) to electrical information (b);

a plurality of driving elements (31 to 35) integrally formed on a semiconductor substrate connected in series through said light emitting elements (1 to 10) to said power supply (28);

current detecting means (36) for outputting as a driving current detecting signal ($V_R$) a total amperage (I) of driving currents flowing through said driving elements (31 to 35) by supplying current to a series circuit having said driving elements (31 to 35), said power supply (28) and said light emitting elements (1 to 10); and control means (39) for comparing said driving current detecting signal ($V_R$) from said current detecting means (36) with a reference signal ($V_S$) for calculation of a reference current value to be supplied to said light emitting elements (1 to 10), and supplying a control signal ($\Delta V$) to said driving elements (31 to 35) so as to obtain a target light quantity from each of said light emitting elements (1 to 10);

whereby said media (16) is stably illuminated by the light from each of said light emitting elements (1 to 10), and said electrical information (b) is accurately obtained from said photo detecting means (19, 20).

2. The illumination type optical recorded information reading device as defined in claim 1, wherein:

said light emitting elements comprise a plurality of light emitting diodes (1 to 10) arranged in lines and optically opposed to a recorded surface of said media (16);

said indication recorded in said media (16) comprises a bar code (17) consisting of bars and spaces alternately arranged;

said photo detecting means comprises a condensing lens (19) for condensing a reflected light from said recorded surface of said media (16), and a line sensor (20) having a plurality of photo detecting elements arranged in lines for converting said reflected light transmitted through said condensing lens (19) to an electrical signal to be output as said electrical information (b);

said driving elements comprises a plurality of bipolar transistors (31 to 35) whose bases are connected together and commonly supplied with said control signal ($\Delta V$);

said current detecting means comprises a fixed resistor (36) connected in series between emitters of said bipolar transistors (31 to 35) and a ground line (GND); and said control means comprises voltage divider circuits (37, 38) for converting a constant voltage ($V_o$) regulated by a voltage regulator (27) to a predetermined reference operational voltage ($V_s$) as said reference signal, and an operational amplifier circuit (39) having a non-inversion input terminal (+) for inputting said reference operational voltage ($V_s$) from said voltage divider circuit (37, 38), an inversion input terminal (−) for inputting said driving current detecting signal ($V_R$), positive and negative power supply terminals connected to said common power supply, and an output terminal connected to said bases of said bipolar transistors (31 to 35).

3. An illumination type optical recorded information reading device comprising:

a media (1) having an optical indication (2) recorded thereon;

photo detecting means (4, 5) for detecting a recorded surface of said media (1) in a predetermined maximum detectable range (W, W') and converting said optical indication (2) to electrical information;

a light emitting element (3a) for supplying light for illuminating said maximum detectable range (W, W') of said photo detecting means (4, 5); and light conducting means (3) for conducting the light emitted from said light emitting element (3a) to said media (1);

wherein a distribution of an illuminance of the light for illuminating said media (1) through said light conducting means (3) is set in such a manner that the illuminance at positions spaced away from a central portion of said maximum detectable range (W, W') is higher than the illuminance at said central portion, and that the illuminance at opposite end portions of said maximum detectable range is lower than the illuminance at said positions spaced away from said central portion.

4. The illumination type optical recorded information reading device as defined in claim 3, wherein said light emitting element comprises a plurality of light emitting elements (3a) arranged in lines at irregular intervals, said light emitting elements (3a) being adapted to be simultaneously turned on.

5. The illumination type optical recorded information reading device as defined in claim 3, wherein said light conducting means (3) comprises (3b, $3c_1$ to $3c_3$) having a condensing characteristic such that a distance between a maximum illuminance position of said illuminance distribution and a central position of said maximum detectable range (W, W') is not largely changed with respect to a change quantity of a distance between said media (1) and said light emitting element (3a);

whereby a desired illuminance distribution rate is maintained with respect to a change in a distance between said lenses (3b, $3c_1$ to $3c_3$) and said media (1).

* * * * *